June 18, 1935. H. H. PLATT 2,004,961
AIRCRAFT
Original Filed April 17, 1931 5 Sheets-Sheet 1
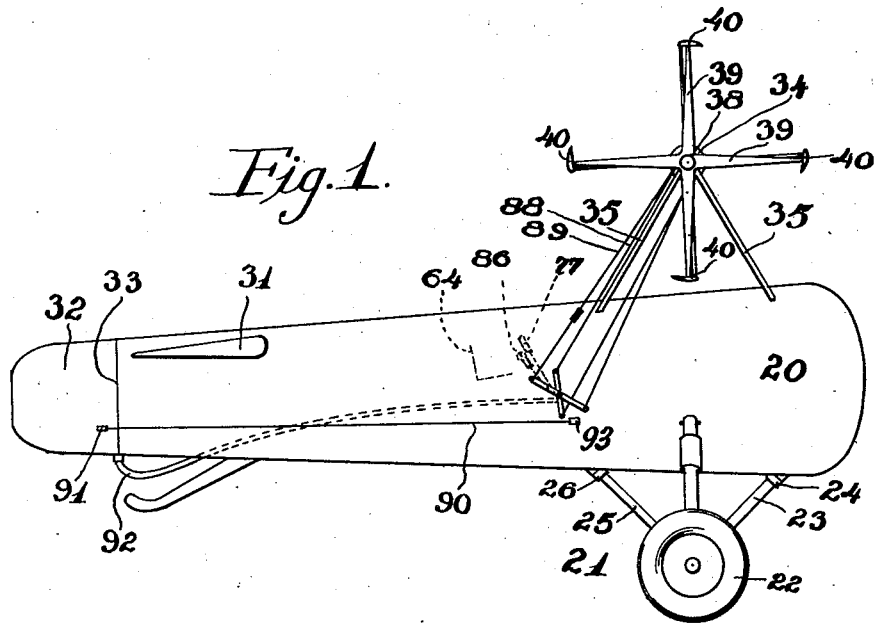
Fig. 1.
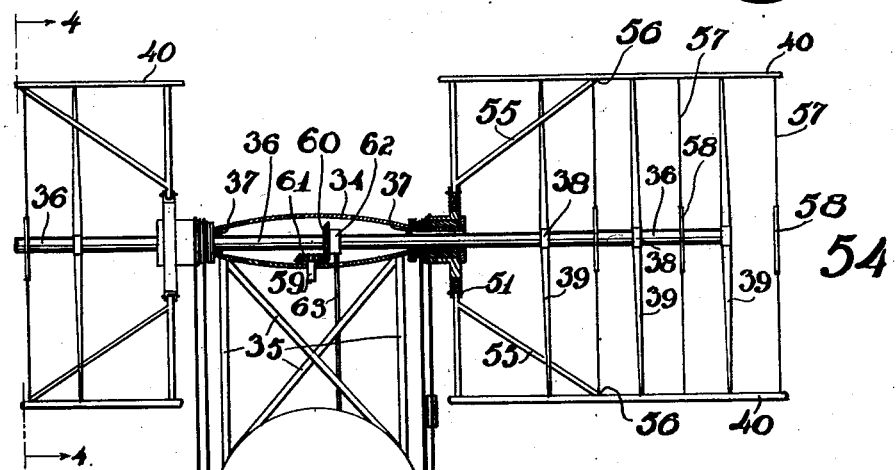
Fig. 2.
INVENTOR.
HAVILAND H. PLATT
BY
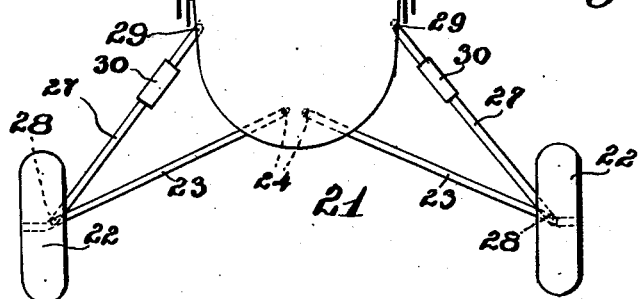
ATTORNEY.

June 18, 1935.    H. H. PLATT    2,004,961
AIRCRAFT
Original Filed April 17, 1931    5 Sheets-Sheet 2
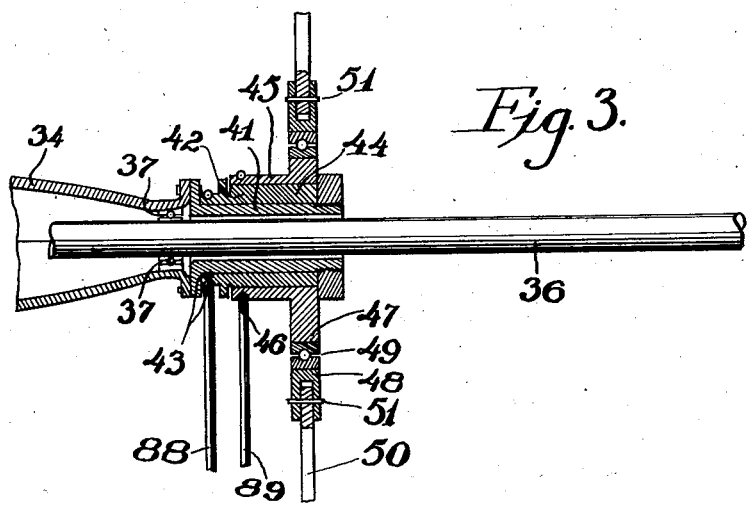
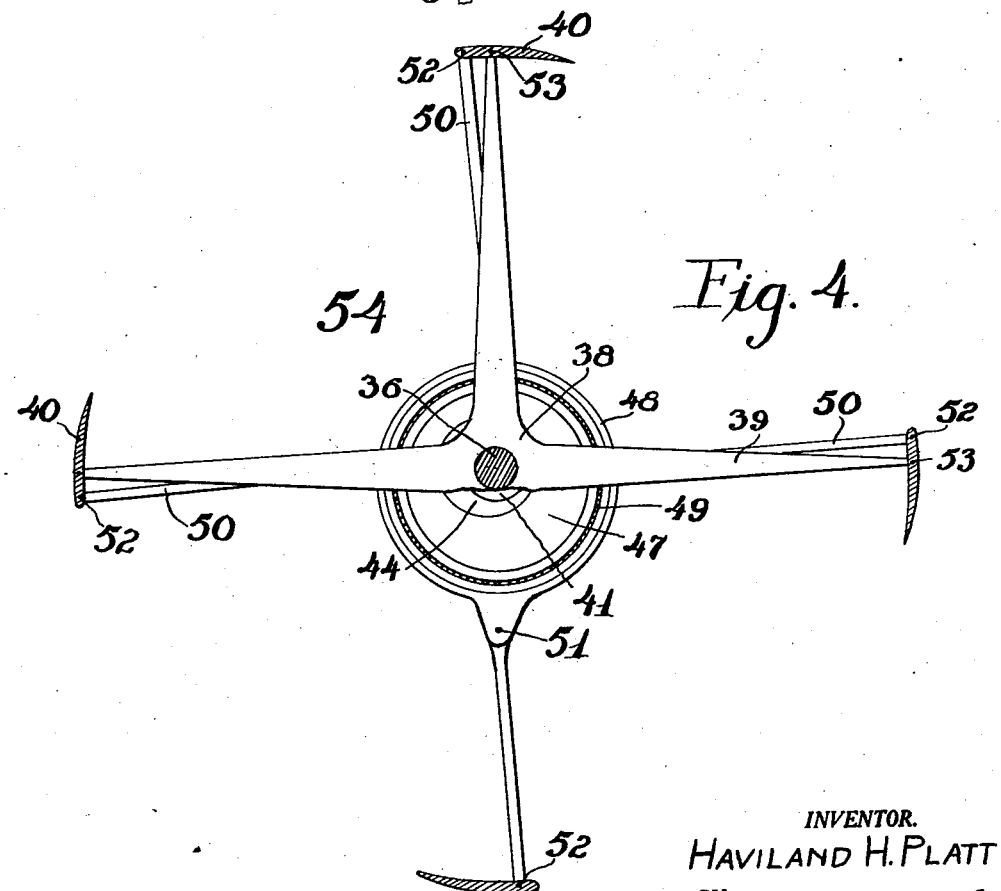
INVENTOR.
HAVILAND H. PLATT
BY
ATTORNEY.

June 18, 1935. H. H. PLATT 2,004,961
AIRCRAFT
Original Filed April 17, 1931 5 Sheets-Sheet 3
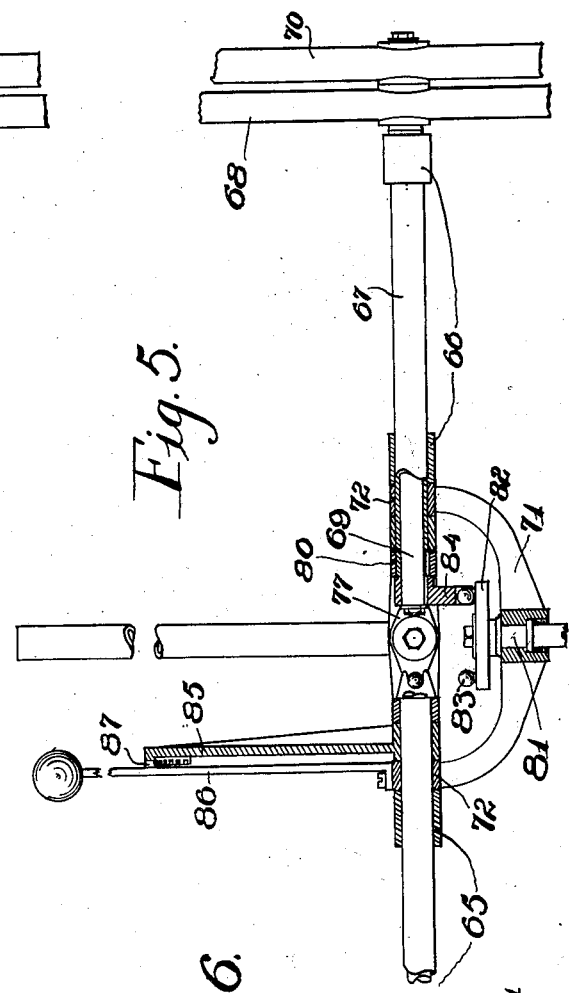
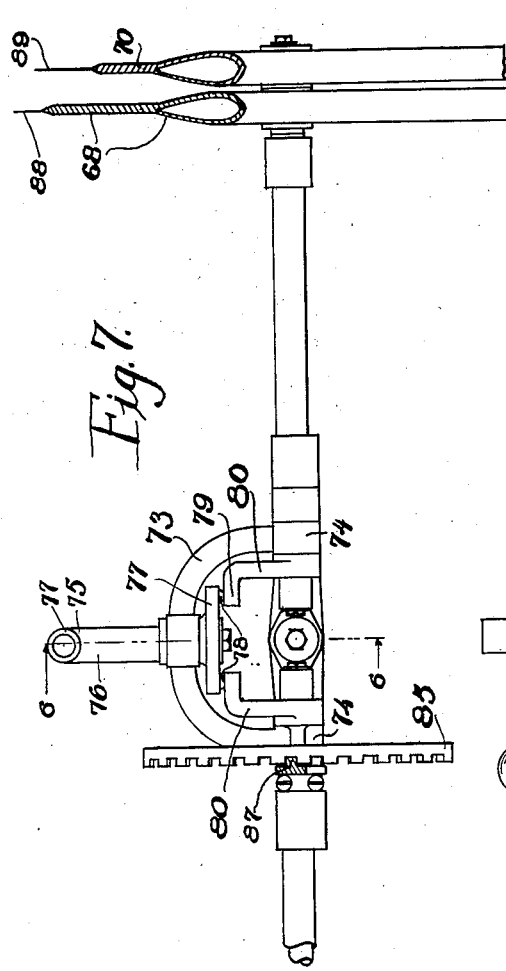
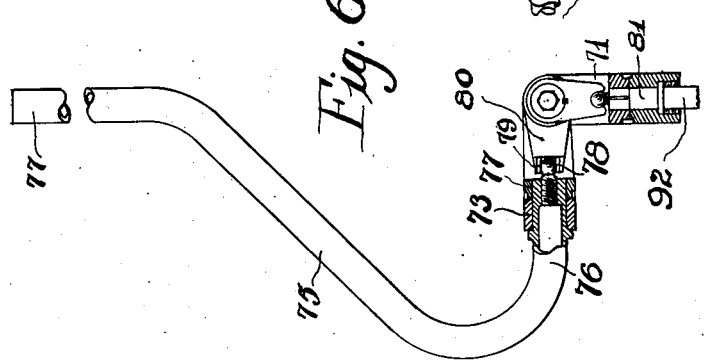
INVENTOR.
HAVILAND H. PLATT
BY
ATTORNEY.

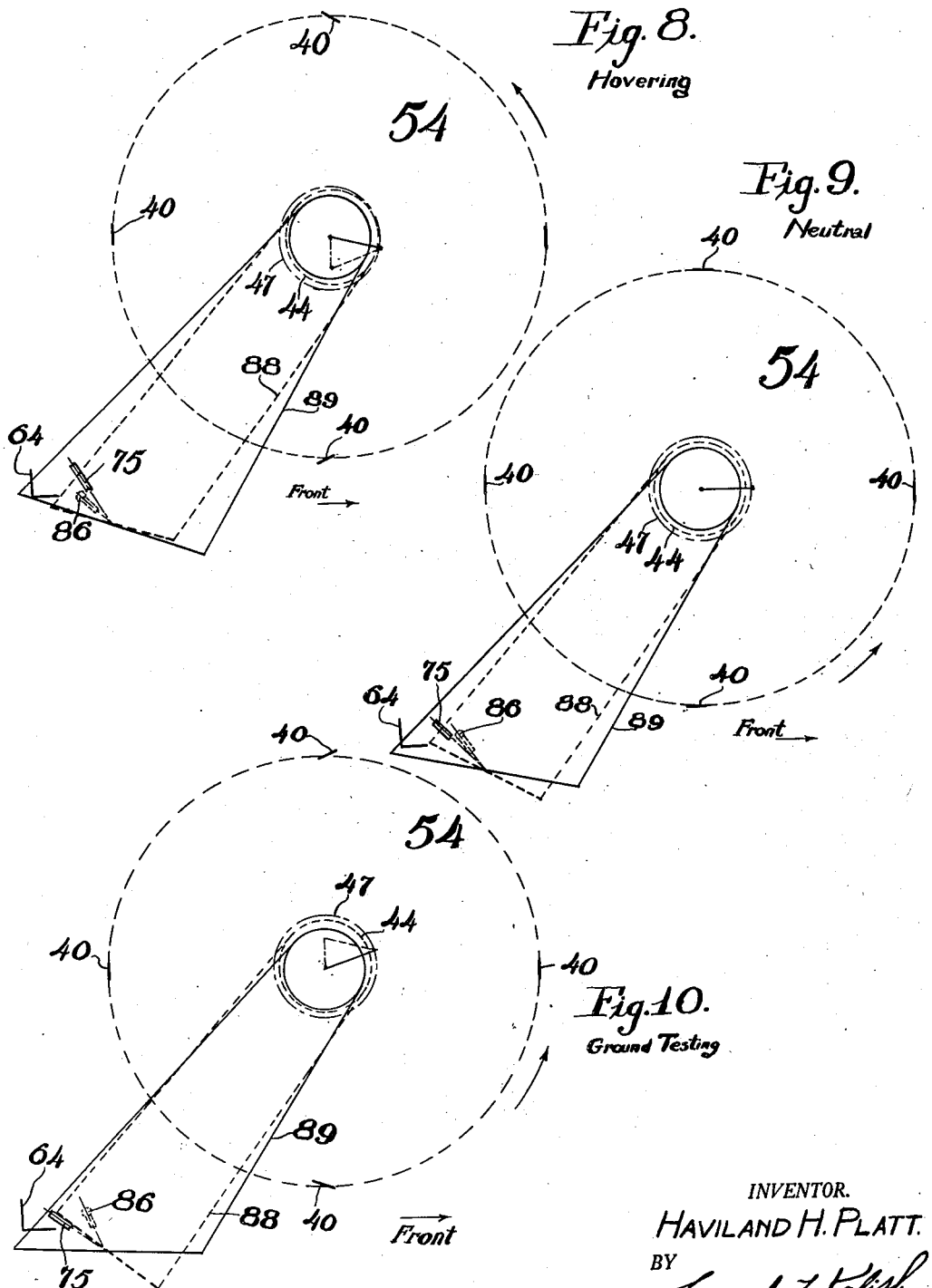

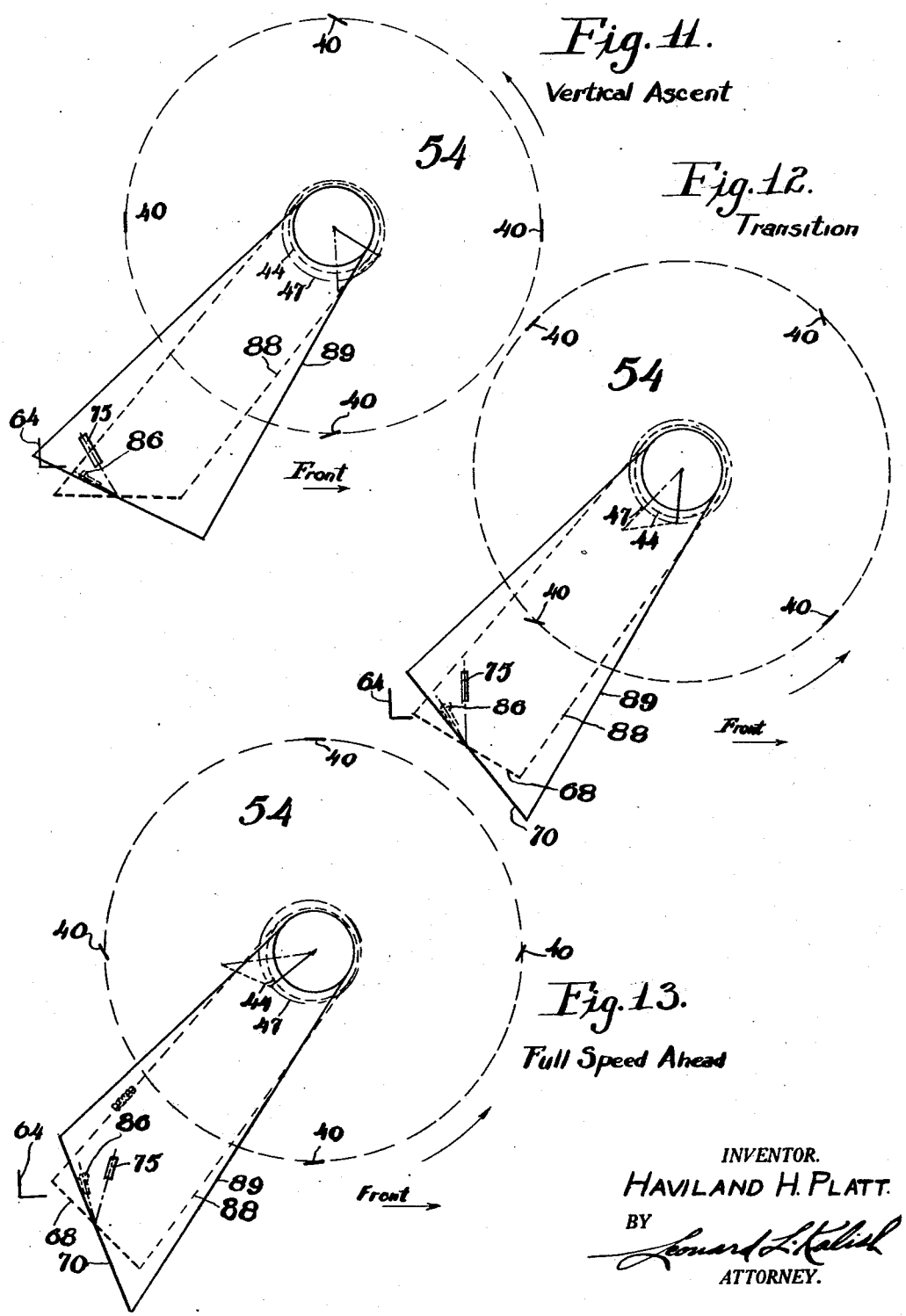

Patented June 18, 1935

2,004,961

UNITED STATES PATENT OFFICE 2,004,961

AIRCRAFT

Haviland H. Platt, New York, N. Y., assignor to Frederick W. Wilkening, Philadelphia, Pa.

Application April 17, 1931, Serial No. 533,232
Renewed September 13, 1932

10 Claims. (Cl. 244—11)

My invention relates to certain new and useful improvements in aircraft of the general type forming the subject matter of my application Serial No. 243,522, filed December 30th, 1927, which has eventuated into Patent No. 1,795,501 dated March 10, 1931.

My present invention relates to controlling means, and other features of construction in the aircraft forming the subject matter of my above identified application.

The aircraft forming the subject matter of my earlier application, comprises a fuselage, a pair of axially aligned rotors, on opposite sides of the fuselage, adapted to be power driven or to be freely rotating at the will of the operator, each of said rotors comprising a plurality of pivotally mounted aerofoil blades, extending generally transversely of the direction of travel of the aircraft, and adapted to revolve in an orbit about the axis of the rotors, means for automatically oscillating each of said aerofoil blades, in succession, about its respective pivot during each revolution of the rotors, said angular oscillations or deflections of the aerofoil blades about their respective pivots being confined within relatively small angles, and means for varying the magnitude of the oscillations or the maximum angle of deflection of said aerofoil blades and for varying the event of the oscillations in the orbit of said aerofoil blades, both at the will of the operator.

The object of my present invention is to provide improved controlling means for said aircraft and to provide other features of construction which will simplify and strengthen the construction of the aircraft as a whole.

With the above and other objects in view, which will appear more fully from the following detailed description, my invention consists of a single manual control, for aircraft of this type, including a control "stick" the forward and rearward deflection of which will tend to deflect and elevate, respectively, the aircraft; and the leftward and rightward deflection of which will act upon the two rotors differentially, thereby to bank the craft in either of said directions.

My invention further consists of a simplified control, whereby the magnitude or amplitude of the oscillations of the rotor blades, as well as the event of the oscillations, may be varied without the intervention of gearing and other intricate mechanism, and whereby the pair of opposed rotors may be mounted nearer to the longitudinal median line of the fuselage, so that the supporting structure intermediate said pair of rotors may be minimized, and whereby greater strength and compactness may be produced in the rotor system.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings, in which like reference characters indicate like parts, Figure 1 represents a side elevation (somewhat diagrammatic) of an aircraft embodying my invention;

Figure 2 represents a section on line 2—2 of Figure 1;

Figure 3 is a much enlarged sectional view of the eccentric, shown in Figure 2;

Figure 4 is a section on line 4—4 of Figure 2;

Figure 5 is a front elevation of the manual control mechanism;

Figure 6 is a side elevation of the same, partly in section;

Figure 7 represents a top plan view of the same;

Figures 8, 9, 10, 11, 12 and 13 represent various diagrammatic views of the relation between the manual control and the rotor, in six different operative conditions of the craft;—said figures showing the craft in the hovering; neutral; ground testing; vertical ascent; transition; and full speed ahead conditions, respectively.

According to my present invention I provide a fuselage 20, which may be of any suitable form, such as indicated in the drawings, including the undercarriage 21, comprising the pair of landing wheels 22, carried upon the outer axle extensions of the arms 23, which are pivotally secured to the fuselage at any suitable point, as at 24. The stay rods 25 are pivotally connected to the arms 23, near the outer ends thereof and are pivotally connected at 26 to the fuselage a suitable distance behind the pivotal point 24, so as to afford the desired triangular bracing for rigidity in a direction parallel to the longitudinal center line of the fuselage. The vertical brace rods 27 are pivotally secured to the arms 23 at 28 and are suitably pivoted to the fuselage at 29. Suitable shock absorbers 30 may be disposed intermediate the ends of the vertical stay rods 27, for the purpose of absorbing the vertical forces or shocks upon the wheels 22 in landing and take-off. The shock absorbers 30 may be of any conventional type.

At the rear of the fuselage a pair of stationary horizontal stabilizers 31 may be provided for affording a suitable amount of lateral stability. The vertical, rudder-like member 32 may be pivotally or rigidly mounted to the rear end of the fuselage, along the pivot or vertical line 33, in any suitable manner.

Above the fuselage 20 the rotor shaft housing 34 is rigidly supported upon suitable supporting members and braces 35. Through the housing 34 the rotor shaft 36 extends;—being suitably supported near the outer ends of the housing 34, by the ball bearings or other suitable bearings 37.

To each of the two opposed outer projecting portions of the rotor shaft 34 a series of three (more or less) arm spiders 38 is rigidly secured, said spiders having a number of blade supporting arms 39 corresponding to the number of blades used in the particular rotor construction;—said arms being in alignment with each other. To the outer ends of the arms 39, corresponding aerofoil blades 40 are pivotally secured, in a manner disclosed in my application hereinabove referred to, so that said blades may be oscillated upon said pivotal supports.

Upon each of the opposite ends of the rotor shaft housing 34 a stationary cylindrical sleeve 41 is provided, concentric with the rotor shaft 36, for supporting the eccentrics which deflect or oscillate the rotor blades. The sleeves 41 may be formed integrally with the rotor shaft housing 34, or they may be affixed thereto by flanges or bolts, as shown in the drawings, or by any suitable means.

Upon each of the stationary sleeves 41, an inner eccentric sleeve 42 is rotatably mounted;— the inner end of which is provided with a sheave-like annular cable receiving groove 43, and the outer portion of which is an eccentrically disposed cylinder 44, of suitable eccentricity.

Upon the eccentric cylinder 44 the outer eccentric sleeve 45 is rotatably mounted:—said outer eccentric sleeve also having a sheave-like annular cable receiving groove or channel 46 at its inner end concentric with respect to the eccentric 44 and having at its outer end the eccentrically formed cylinder 47.

The principle of the two eccentrics 44 and 47, the latter carried by the former, is the same as the principle of the double eccentrics disclosed in my application hereinabove identified. Thus, by fixing the inner and outer eccentrics with respect to each other and thus revolving them in unison or together, the aggregate or effective eccentricity of said two eccentrics is merely shifted or displaced angularly with respect to the axis of the shaft 36, while the rotation of one eccentric with respect to the other increases or decreases, as the case may be, the resultant, or effective eccentricity of the double or composite eccentrics.

An annular ring or eccentric strap 48 is mounted upon the outer eccentric 47, through any suitable bearing, such as the ball bearing 49. A series of eccentric rods 50, corresponding to the series of blades 40, is pivotally secured to the ring or strap 48, at a series of circumferentially equidistant points 51, with their outer ends pivoted to the corresponding blades 40, at points 52, in advance of, or behind the supporting pivot point 53 (with respect to the cross section of the blades) a suitable distance, so that the generally radial displacement of the eccentric rods 50, during each revolution of the rotors 54, will cause a corresponding deflection or oscillation of the blades 40 about their supporting pivot points 52.

Auxiliary eccentric rods 55 may also be provided intermediate the pivots 51, and auxiliary blade pivots 56, in alignment with the pivots 52, so that the deflecting forces of the eccentrics may be transmitted to the blades at an added point nearer to the center of the blades, thereby minimizing any tendency of the blades to twist due to the deflecting forces.

For the purpose of increasing the stability of the rotors and further to eliminate any tendency of the blades to twist, tensional braces 57, in the form of tension rods or cables may be interposed between the blades 40 of each rotor, said tensional braces being pivotally secured to said blades at pivotal points in alignment with the pivotal points 52 and 56. The tensional braces 57 are preferably connected to the four corners of a frame 58, which surrounds the shaft 36, so that the tension may be transmitted in a line through the shaft without interfering with the shaft.

Within the rotor shaft housing 34, suitable gearing may be provided for operatively connecting the rotor shaft 36 with a suitable driving shaft 59; said gearing comprising the bevel gear 60 and the bevel pinion 61. The driving shaft 59 is extended to any suitable point within the fuselage or outside of the fuselage, and is operatively connected to the force of motive power, such as internal combustion engine or the like, which latter may be located at any suitable point (not shown in the drawings). Any suitable clutch 62 may be operatively interposed between the rotor shaft 36 and the driving means, such as the bevel gear 60, for the purpose of permitting the free rotation of the rotors independently of the engine, if desired. Any suitable clutch operating handle or means 63 may be provided, extending into the fuselage, for permitting the operator to engage and disengage the clutch at will.

Within the cock-pit of the fuselage, located suitably with respect to the pilot's seat 64, I provide the control mechanism shown particularly in Figures 5, 6 and 7. The control mechanism shown in Figures 5 and 6 includes opposed pairs of axially aligned stationary bearings 65 and 66 rigidly and permanently mounted or affixed to the fuselage, with their axis extending transversely of the fuselage, suitably in advance of the pilot's seat. Within the bearing 66 and within the bearing 65, similar tubular shafts 67 are rotatably mounted;—the outer ends of each of said shafts extending through and clear of the fuselage and having attached thereto the corresponding rocker arms 68 on the outside of the fuselage.

Through each of the hollow tubular shafts 67, a corresponding inner shaft 69 is extended, with its opposite ends projecting clear of the outer tubular shaft 67 and having the rocker arms 70 mounted on their outer ends.

The rudder bar yoke 71 is rotatably mounted upon the outer tubular shafts 67;—having opposed journal portions 72 surrounding and journalled upon said outer shafts 67. A control stick yoke 73 is similarly mounted upon the outer shafts 67, having opposed journal portions 74, which surround and are journalled upon said shafts 67 as shown particularly in Figures 5 and 7.

The control stick 75 is provided with a generally horizontal portion 76 and a vertical or operating portion 77, generally at a right angle to the lower portion 76. The lower horizontal end 76 of the stick 75 extends horizontally through the center of the yoke 73 and is journalled therein, so that the stick may be oscillated transversely. To the inner journalled end of the stick 76, a differential lever 77 is secured, normally in a horizontal position, said differential lever having a pair of opposed spherical projections or knobs 78, which extend into the bifurcated ends 79 of the outer differential fingers 80, secured to the outer tubular shafts 67, so that a transverse or sidewise deflection of the control stick 75 will cause opposite rotations of the two outer tubular shafts 67.

Through the center of the rudder bar yoke 71, a rudder bar shaft 81 is journalled, extending through said yoke in a generally upright direction. To the inner end of the shaft 81, the rudder bar differential lever 82 is secured, having a pair of opposed and generally spherical projections or knobs 83, which extend into and operatively engage the bifurcated ends of the opposed inner differential fingers 84, which are secured to the two opposed inner shafts 69, respectively.

A suitable flexible shaft 92 may be extended from the shafts 81 to the rudder shaft at the rear of the fuselage or to the shaft or pivot of any suitable or conventional foot-operated treadle, or rudder bar 93, so that a deflection of the foot-operated rudder bar will cause a corresponding rotation of the shaft 81, and thereby to cause a differential variation in the event of a blade oscillation in the two rotors, so as to cause a "banking" of the craft.

To the control stick yoke 73, a notched or toothed sector 85 is secured, while to the rudder bar yoke 71, a blade angle control handle 86 is secured, having a suitable detent 87 in juxtaposition to the teeth of the sector 85. A suitable amount of spring or resiliency is provided in the blade angle control handle 86, so that the same may be deflected away from the sector 85 against the spring inherent in said arm to an extent sufficient to disengage the detent 87 from the teeth or notches of the sector 85.

By changing the position of the handle 86 with respect to the sector 85, angular relation of the inner and outer shafts 69 and 67 is varied, and so also the angular relation of the rocker arms 70 and 68 is similarly varied.

From the two ends of the rocker arms 68, on each side of the fuselage, cables 88 extend around the sheave or cable groove 43 on the inner eccentric sleeve 42, so that the deflection of the rocker arms 68 is transmitted to the inner eccentrics 44.

From the outer ends of each of the rocker arms 70, corresponding cables 89 extend around the sheave or cable groove 46 of the outer eccentric sleeve 45, so that the deflections of the rocker arms 70 are translated into corresponding angular or rotary displacements of the outer eccentrics 47.

A suitable resilient take-up device, as for instance, a tension spring or the like, may be inserted in the slack side of the cable 89, so as to compensate or take up any slack in the cable due to the eccentricity of the cable groove or sheave 46.

The rudder-like member 32 may be stationary or fixed or it may be operated in the conventional manner by means of foot-operated treadles or foot-operated rudder-bar 93, which may be connected through cables 90 on the two sides of the fuselage to cable arms 91 carried by the rudder or rudder shaft. The foot-treadles are not shown in detail in the drawings, but are merely indicated in end-view in Figure 1 of the drawings, as these are merely conventional foot type of rudder bar.

The flexible shaft 92 may be extended from the shaft 81 directly to the shaft or pivot of the rudder-bar 93, or it may be extended to the shaft of the rudder-like member 32, if the latter is pivotally mounted, and through this flexible shaft the deflection of the rudder bar 93 automatically deflects the differential rotor control lever 82. This in turn differentially affects the inner control shafts 69 and hence the outer eccentrics 47;—thereby advancing one eccentric and retarding the other eccentric, so as to increase the lift on one rotor and decrease the lift on the other rotor and thereby bank the craft.

Lateral control of the ship on the other hand is obtained through the transverse maneuver of the control stick 75, while longitudinal and vertical control of the ship is obtained through the longitudinal maneuver of the stick 75.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I hereby claim as new and desire to secure by Letters Patent, is:

1. Aircraft comprising a fuselage, a pair of rotors, each of said rotors comprising a plurality of pivotally mounted aerofoil blades, extending generally transversely of the normal direction of travel of the aircraft and adapted to revolve in an orbit about the axis of the rotors, means for automatically oscillating each of said aerofoil blades, in succession, about its respective pivot during each revolution of the rotors, said angular oscillations or deflections of the aerofoil blades about their respective pivots being confined between angles substantially less than 360 degrees, means for varying the amplitude of said angular blade oscillations, means for varying the event of said oscillations in the orbit of said aerofoil blades, and a universally deflectable control stick in the fuselage, operatively connected to said amplitude and event varying means, which stick, when deflected in the longitudinal median plane of the craft, acts equally upon the two rotors to vary the event of the blade oscillations thereof, and which stick when deflected transversely of the aircraft, acts differentially upon the rotors, differentially to vary the event of the oscillations thereof.

2. An aircraft comprising a fuselage, a pair of rotors, each of said rotors comprising a plurality of pivotally mounted aerofoil blades, extending generally transversely of the normal direction of travel of the aircraft and adapted to revolve in a orbit about the axis of the rotors, means for automatically oscillating each of said aerofoil blades, in succession, about its respective pivot during each revolution of the rotors, said angular oscillations or deflections of the aerofoil blades about their respective pivots being confined between angles substantially less than 360 degrees, means for varying the amplitude of said angular blade oscillations, means for varying the event of said oscillations in the orbit of said aerofoil blades, a rudder for influencing the lateral direction of the craft, and a single manually operable control stick in the fuselage, operatively connected to said amplitude and event varying means and said rudder, adapted to be deflected in a plane parallel to the longitudinal vertical median plane of the craft, to equally vary the event of the blade oscillations of both rotors, and adapted to be deflected transversely of the aircraft, differentially to vary the event of the oscillations of the two rotors, thereby to bank the craft, and simultaneously to deflect the rudder in the corresponding direction and to a corresponding extent.

3. Aircraft comprising a fuselage, a rotor comprising a plurality of pivotally mounted aerofoil blades extending generally transversely of the normal direction of travel of the aircraft and adapted to revolve in an orbit about the axis of the rotor, means for automatically oscillating each of said aerofoil blades, in succession, about its respective pivot during each revolution of the rotor, said angular oscillations or deflections of the aerofoil blades about their respective pivots being confined between angles substantially less than 360 degrees means for varying the amplitude of said angular blade oscillations, means for varying the event of said oscillations in the orbit of said aerofoil blades, and a universally deflectable control member in the fuselage, operatively connected to said amplitude and event varying means.

4. An aircraft comprising a fuselage, a pair of rotors, each of said rotors comprising a plurality of pivotally mounted aerofoil blades, extending generally transversely of the normal direction of travel of the aircraft and adapted to revolve in an orbit about the axis of the rotors, means for automatically oscillating each of said aerofoil blades, in succession, about its respective pivot during each revolution of the rotors, said angular oscillations or deflections of the aerofoil blades about their respective pivots being confined between angles substantially less than 360 degrees, means for varying the amplitude of said angular blade oscillations, means for varying the event of said oscillations in the orbit of said aerofoil blades, a rudder for influencing the lateral direction of the craft, and single manually operable control means in the fuselage, operatively connected to said amplitude and event varying means and said rudder, adapted to be deflected in a plane parallel to the longitudinal vertical median plane of the craft, equally to vary the event of the blade oscillations of both rotors, and adapted to be deflected transversely of the aircraft, differentially to vary the event of the oscillations of the two rotors, thereby to bank the craft and simultaneously to deflect the rudder in the corresponding direction and to a corresponding extent.

5. An aircraft comprising a fuselage, a pair of rotors, each of said rotors comprising a plurality of pivotally mounted aerofoil blades extending generally transversely of the normal direction of travel of the aircraft, and adapted to revolve in an orbit about an axis generally above the center of gravity of the fuselage, means for automatically oscillating each of the blades in succession during each revolution of the respective rotors, about their respective pivots, between two predetermined limiting angles, means for positioning the two limits of angular blade oscillation, at any desired part of the orbit of the blades at the will of the operator, means for varying the angle between the two limits of blade oscillation, also at the will of the operator, a rudder for influencing the lateral direction of the craft, and manually operable control means in the fuselage operatively connected to said first-named two means and said rudder for controlling the same in definite relation to each other.

6. An aircraft comprising a fuselage, a pair of rotors, each of said rotors comprising a plurality of pivotally mounted aerofoil blades extending generally transversely of the normal direction of travel of the aircraft, and adapted to revolve in an orbit about an axis generally above the center of gravity of the fuselage, means for automatically oscillating each of said blades in succession during each revolution of the respective rotors, about their respective pivots, between two predetermined limiting angles, means for positioning the two limits of angular blade oscillation, at any desired part of the orbit of the blades at the will of the operator, means for varying the angle between the two limits of blade oscillation, also at the will of the operator, a rudder for influencing the lateral direction of the craft, and manually operable control means in the fuselage operatively connected to said first-named two means and said rudder for controlling the same in definite relation to each other, a source of power carried by the fuselage operatively connected with said rotors, rotatably to propel the same with the leading sides thereof travelling generally upwardly.

7. In an aircraft, a fuselage, a pair of rotors each including a plurality of aerofoil blades, said rotors being adapted to revolve generally about an axis extending transversely of the direction of travel of the aircraft, automatic means for angularly oscillating each of the blades of each of the rotors, in succession as said blades pass through each revolution of their respective rotors, said oscillations being confined between two predetermined opposed limits, means for varying the positions of the two opposed limits of angular blade deflection, and hence, to vary the event of the blade oscillations in the orbit of the blades, means for varying the angle between the two limits of angular blade deflection in each of said rotors, a rudder for influencing the lateral direction of the craft, and manually operable control means in the fuselage, operatively connected to the means for varying the event of the blade oscillations in each of the rotors and to said rudder, thereby to operate the event-controlling means in each of the rotors and said rudder in relation to each other.

8. An aircraft comprising a fuselage, a pair of rotors, each of said rotors comprising a plurality of pivotally mounted aerofoil blades, extending generally transversely of the normal direction of travel of the aircraft, and adapted to revolve in an orbit about the axis of the rotors, means for automatically oscillating each of said aerofoil blades, in succession, about its respective pivot during each revolution of the rotors, said angular oscillations or deflections of the aerofoil blades about their respective pivots being confined between angles substantially less than 360 degrees, means for varying the amplitude of said angular blade oscillations, means for varying the event of said oscillations in the orbit of said aerofoil blades, a rudder-like member for laterally influencing the craft, and manually operable control means in the fuselage, operatively connected to said amplitude and event varying means, adapted to be deflected in a plane parallel to the longitudinal vertical median plane of the craft, equally to vary the event of the blade oscillations of both rotors, and adapted to be deflected transversely of the aircraft, differentially to vary the event of the oscillations of the two rotors.

9. An aircraft comprising a fuselage, a pair of coaxially disposed rotors having their axes generally above the center of gravity of the fuselage, and extending generally transversely of the normal direction of travel of the aircraft, each of said rotors including a plurality of pivotally mounted cambered aerofoil blades spaced generally uniformly from the axis thereof and having their respective pivotal axes intermediate their respective leading and trailing edges, a source of power adapted rotatively to propel said rotors with the leading side of the rotors traveling upwardly, variable means for oscillating each of said aerofoil blades in succession about their respective axes, and common control means within the fuselage for varying the magnitude and event of said oscillations either in unison or differentially.

10. In aircraft of the character stated, having a pair of coacting rotors each including a plurality of blades capable of cyclic oscillations in each revolution of the rotor;—manually operable control within the fuselage adapted to vary the magnitude and event of said blade oscillations either uniformly or differentially in said two rotors, at the will of the operator, comprising a pair of similar and opposite rotatable shafts each adapted to vary the magnitude of the blade oscillation of one of the rotors, respectively, and another pair of similar and opposite rotatable shafts each adapted to vary the event of the blade oscillation of one of the said two rotors, respectively, and a variable coupling between said first pair of shafts and a variable coupling between said second pair of shafts, each capable of independent rotational motion about an axis disposed transversely of the axes of said shafts and also capable of being swung about the axes of said shafts, and handle means for rotating said variable couplers about their axes, respectively, or about the axes of such shafts, at the will of the operator.

HAVILAND H. PLATT.